United States Patent
Parthasarathy et al.

(10) Patent No.: US 6,934,828 B2
(45) Date of Patent: Aug. 23, 2005

(54) DECOUPLING FLOATING POINT LINEAR ADDRESS

(75) Inventors: Rajesh S. Parthasarathy, Hillsboro, OR (US); Aravindh Bakthavathsalu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 10/246,780

(22) Filed: Sep. 17, 2002

(65) Prior Publication Data

US 2004/0054868 A1 Mar. 18, 2004

(51) Int. Cl.[7] .............................................. G06F 12/00
(52) U.S. Cl. ....................... 711/215; 711/203; 711/204; 711/213; 711/214; 712/217; 712/218; 712/219; 712/222; 712/223; 712/224; 712/229
(58) Field of Search .................. 711/202–205, 213–215; 708/510; 712/23, 222–239, 217–219

(56) References Cited

U.S. PATENT DOCUMENTS

| | | | | |
|---|---|---|---|---|
| 4,763,294 A | * | 8/1988 | Fong ........................... | 708/510 |
| 5,559,977 A | * | 9/1996 | Avnon et al. ................ | 712/244 |
| 5,579,527 A | * | 11/1996 | Chin et al. .................... | 712/16 |
| 5,581,778 A | * | 12/1996 | Chin et al. .................... | 712/16 |
| 5,721,857 A | * | 2/1998 | Glew et al. .................... | 712/23 |

OTHER PUBLICATIONS

Clouser et al, Jul. 1999, IEEE Journal of solid–state–circuits, vol. 34, 1026–1029.*

* cited by examiner

*Primary Examiner*—Donald Sparks
*Assistant Examiner*—Hashem Farrokh
(74) *Attorney, Agent, or Firm*—Fish & Richardson P.C.

(57) ABSTRACT

A technique is described to reduce the complexity of floating point linear address (FLA) maintenance in a superscalar processor by coupling FLA updates when floating point data is stored instead of when floating point addresses are stored.

15 Claims, 3 Drawing Sheets

| MOB 210 → | Operation Type 310 | Address 320 | Store ID 330 |
|---|---|---|---|
| | | | |
| | L | 0x0110 | |
| | S | 0x1010 | |
| | L | 0x1010 | |
| | | | |

FIG. 3

DECOUPLING FLOATING POINT LINEAR ADDRESS

BACKGROUND

In a superscalar architecture, a computer system can increase the efficiency of the execution unit by issuing instructions out of sequence. A superscalar architecture is a processor design that allows more than one machine instruction to be executed during a clock cycle.

In some processor designs, machine instructions are further broken into one or more microinstructions. A microinstruction is the fundamental building block of instruction set design, and typically implements an elemental task.

In a traditional superscalar design, a processor includes a scheduler and multiple execution units. The scheduler receives a sequential instruction stream, determines dependencies between the instructions, and reorders the instructions based on the dependencies to increase the efficiency of execution by allowing instructions to be executed in parallel and by removing some unnecessary pipeline delays that may result from needing to wait for the results of a prior instruction before executing a subsequent instruction. These delays may be referred to as stalls.

Processor speeds typically far surpass the speeds of main memory devices. Thus, many processor clock cycles may be required to retrieve information from main memory. One approach to increase the performance is to increase the instruction window in which a superscalar processor looks ahead to 20 to 30 instructions or more. In combination with techniques such as predictive branching and speculative execution, this lookahead technique may be used to improve the performance of a superscalar processor.

The instruction window may be increased by providing an instruction pool. Instructions may then be loaded into the instruction pool so that they may be reordered and processed with branch prediction to help prevent unnecessary stalls and to try to take advantage of otherwise unused clock cycles. While this may increase the performance of the system, it also increases the complexity of the system logic, which correspondingly increases the possibilities of design and manufacturing defects.

DESCRIPTION OF DRAWINGS

FIG. 3 is a block diagram of a memory order buffer in a dispatch/execute unit.

DETAILED DESCRIPTION

In a general aspect, a digital circuit includes a fetch/decode unit, a floating point linear address register, and a floating point execution unit. The fetch/decode unit receives an instruction stream that includes a floating point save instruction, and generates a floating point save address and a floating point save data microinstruction corresponding to the floating point save instruction. The floating point execution unit is coupled to the floating point linear address register and uses the floating point linear address register in executing floating point instructions. An update of the floating point linear address register is triggered by the floating point store data microinstruction.

The digital circuit also may include an event floating point linear address register. When such a register is present, the floating point store data microinstruction may trigger the update of either the floating point linear address register or the event floating point linear address register.

The digital circuit may also include a memory order buffer. The memory order buffer maintains information pertaining to load and store instructions. When triggered by the execution of the floating point store data microinstruction, the memory order buffer updates the floating point linear address. The information pertaining to load and store operations maintained by the memory order buffer includes for each load or store instruction: an operation type field, an address field, and a store identifier field. The operation type field indicates whether the instruction is a load instruction or a store instruction.

The floating point store data microinstruction may trigger an update of the floating point linear address by writing fault information, for example, to a fault information bus. The fault information may be used to update the microinstruction-level floating point linear address register.

Figure 1:
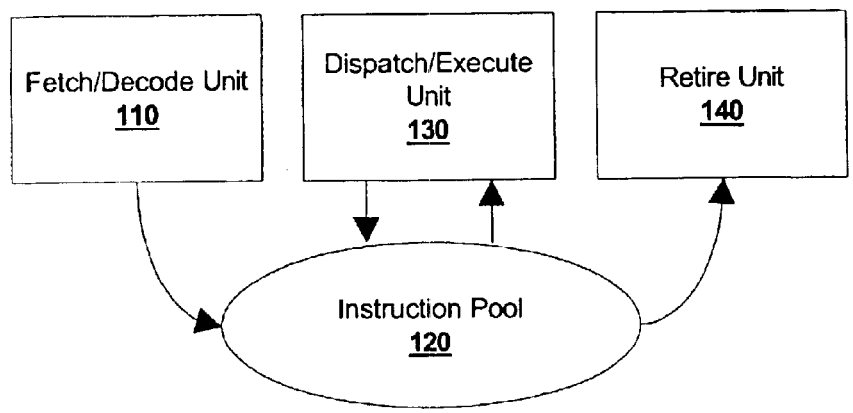
FIG. 1 is a block diagram of scheduling components of a processor.

Referring to FIG. 1, a superscalar processor includes a fetch/decode unit 110 that receives instructions in an instruction stream, fetches the instructions from a memory, such as an instruction cache, decodes the instructions, and sends the instructions to an instruction pool 120. In some processor architectures, the decode unit breaks each instruction down into one or more microinstructions that may be executed to carry out the instruction.

Instructions in instruction pool 120 are then selected, possibly out of order, scheduled, and processed by a dispatch/execute unit 130. A retire unit 140 retires instructions in order as they are executed. This model allows for speculative execution of instructions so as to reduce or avoid stalls.

Figure 2:
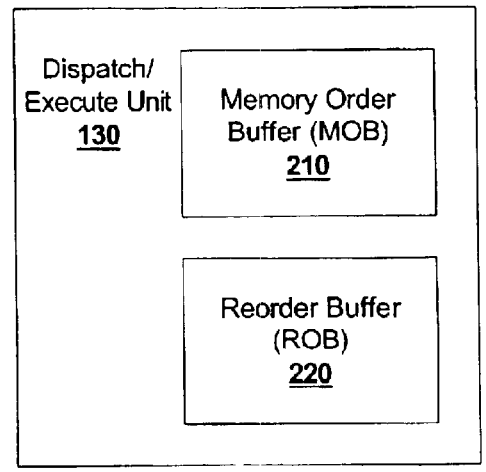
FIG. 2 is a block diagram of a dispatch/execute unit supporting speculative instruction execution in a superscalar processor.

Referring to FIG. 2, a superscalar processor (such as that shown in FIG. 1) may support speculative execution of instructions with the assistance of a memory order buffer (MOB) 210 and a reorder buffer (ROB) 220. The MOB 210 is a portion of dispatch/execute unit 130 that allows out-of-order memory operations to be performed. The MOB keeps track of information regarding memory load and store instructions by keeping, for example, the address and data (for stores) for memory operations. This allows data dependencies to be determined and permits out-of-order execution of memory operations.

The ROB 220 supports speculative instruction execution and out-of-order instruction execution by providing a physical register space for register renaming. Additionally, the ROB 220 provides a buffer to store the results of speculative instruction execution. The ROB 220 also detects exceptions and mispredictions to assist in recovery when the wrong execution path is speculatively executed.

In a conventional system, a floating point store operation is broken into two microinstructions by the dispatch/execute unit 130. The first microinstruction (fp_store_address) computes the address at which data is to be stored and the second microinstruction (fp_store_data) stores the data at that address.

To support speculative instruction execution (including branch prediction), the MOB keeps track of load and store operations. For example, when speculatively executing a floating point store operation, the MOB would keep track of the instruction and the floating point linear address (FLA) of the memory location referenced by the store operation. The FLA is determined when the fp_store_address microinstruction is executed. In previous systems, the FLA was updated in the MOB upon execution of this microinstruction. While it would seem logical to associate FLA maintenance with the store address microinstruction that determine the FLA, doing so requires dedicated logic to delay the FLA updates until the associated store data microinstruction retires or events. For example, the FLA should not be updated if the associated fp_store_data microinstruction is never executed. This mechanism is not simple and resulted in several boundary cases.

Additionally, the MOB typically has complex logic to handle collisions between control register writes and FLA updates, because control registers are usually implemented as a single-port register file. When a collision occurs, the FLA update logic recirculates FLA updates, provided no younger FLA updates are pending. This logic is hard to validate and has many boundary conditions.

Finally, a typical MOB has back-to-back array read restrictions for FLA. This introduces complexity in the FLA control logic so that bubbles are introduced to prevent FLA reads on consecutive clock cycles.

The many complexities of FLA maintenance in the MOB increases the likelihood of errors in design and manufacture, often causing pre- and post-silicon bugs. The logic required for FLA maintenance may be simplified by associating the floating point linear address with the store data microinstruction rather than the store address microinstruction. Because the address is not readily available when the fp_store_data microinstruction is executed, it may be easier to use the instruction sequence number to match the proper floating point linear address with the proper data.

By decoupling the FLA update from the fp_store_address microinstruction and associating it with the fp_store_data instruction, the complexity of the MOB logic for FLA update may be dramatically reduced.

Referring to FIG. 3, the MOB 210 maintains various information regarding memory operations until the operations are retired. For example, MOB 210 includes an operation type field 310, an address field 320, and a store identifier field 330. The operation type field 310 identifies the operation as either a load or store operation. The address field 320 identifies the memory location to be read or written. Finally, the store identifier field 330 identifies the previous store within the MOB 210 for the address indicated in address field 320. The MOB maintains an entry for each memory instruction until the instruction is retired.

Floating point instructions are executed by a floating point execution unit. The floating point execution unit typically uses the FLA to process floating point operations. The FLA needs to be updated to perform load and store floating point operations.

In a more detailed implementation, a superscalar processor includes support for event handling. When an event occurs, the normal execution sequence is interrupted to handle the event. After the event is processed, the normal execution sequence resumes. Thus, if a floating point load or store operation occurs during an event, it is desirable to avoid changing the current FLA. One typical way to do this is to have two FLAs, with one (EVENT_FLA) for events, and one (UARCH_FLA). While an event is being processed, floating point load and store operations update EVENT_FLA. Otherwise the operations update UARCH_FLA.

In this implementation, the processor is modified so that the floating point store data microinstruction (fp_store_data) triggers a FLA update of the appropriate FLA register (either EVENT_FLA or UARCH_FLA). This is done by having fp_store_data microinstructions update the fault info bus with data to trigger the update. ROB 220 generates signals based on fault info to trigger FLA updates by MOB 210.

Figure 4:
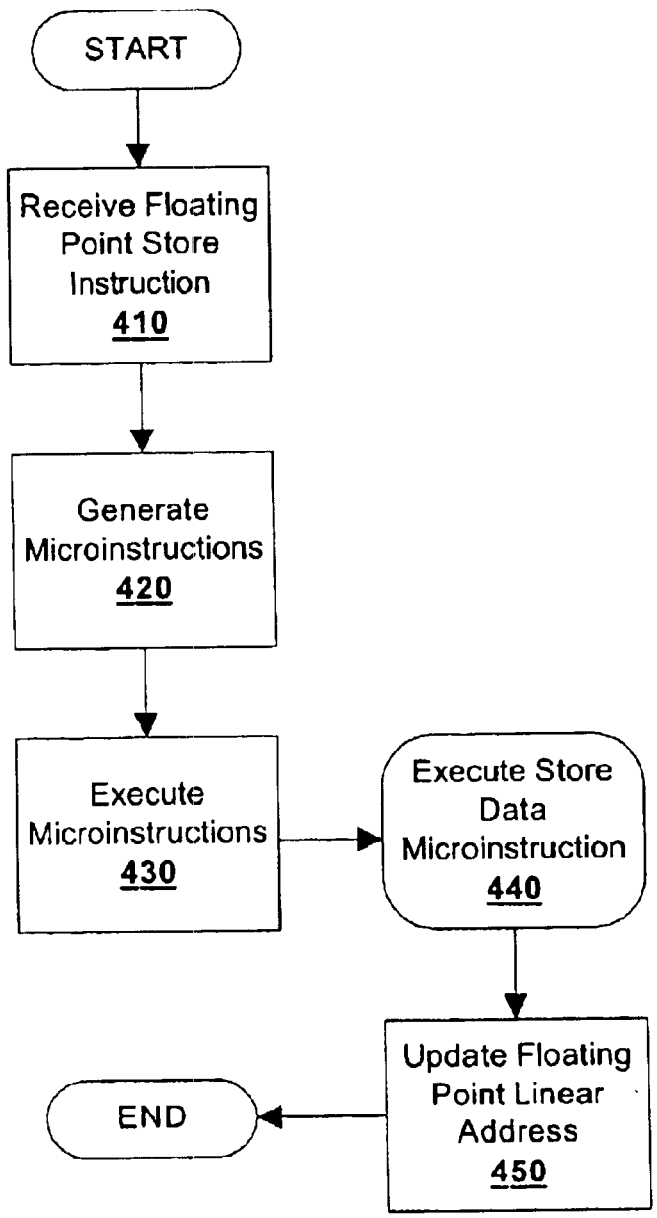
FIG. 4 is a flow chart of a process for updating the floating point linear address when executing floating point store data microinstructions.

Referring to FIG. 4, floating point linear address in a superscalar microprocessor is performed during the execution of floating point store instructions as follows. The system receives an instruction stream including one or more floating point store instructions (step 410).

The system then generates microinstructions corresponding to the floating point store instruction, including a floating point save address microinstruction and a floating point save data microinstruction (step 420).

Microinstructions are executed by the system (step 430), possibly out of order and/or speculatively. When a floating point store data microinstruction is executed (step 440), the system triggers the update of the floating point linear address (step 450).

What is claimed is:

1. A digital circuit comprising:
   a fetch/decode unit that receives an instruction stream that includes a floating point save instruction, the fetch/decode unit generating a floating point address save microinstruction and a floating point data save microinstruction corresponding to the floating point save instruction;
   a floating point linear address register; and
   a floating point execution unit coupled to the floating point linear address register, the floating point execution unit using the floating point linear address register in executing floating point instructions,
   wherein an update of the floating point linear address register is triggered by the floating point store data microinstruction.

2. The digital circuit of claim 1 further comprising an event floating point linear address register, wherein the floating point store data microinstruction triggers the update of the floating point linear address register or the event floating point linear address register.

3. The digital circuit of claim 1 further including a memory order buffer, the memory order buffer maintaining information pertaining to load and store instructions,
   wherein the memory order buffer updates the floating point linear address when triggered by the execution of the floating point store data microinstruction.

4. The digital circuit of claim 3 wherein the information pertaining to load and store operations maintained by the memory order buffer includes for each load and store instruction:
   an operation type field;
   an address field; and
   a store identifier field.

5. The digital circuit of claim 4 wherein the operation type field indicates whether the instruction is a load instruction or a store instruction.

6. The digital circuit of claim 3 wherein the floating point store data microinstruction triggers update of the floating point linear address by writing fault information.

7. The digital circuit of claim 1 wherein the floating point linear address register is a microinstruction-level register.

8. A method comprising:

receiving a floating point store instruction;

generating a floating point store address microinstruction;

generating a floating point store data microinstruction;

executing the floating point store address microinstruction and the floating point store data microinstruction, the floating point store data microinstruction triggering the update of a floating point linear address register; and updating a floating point linear address register when triggered by the execution of the floating point store data microinstruction.

9. The method of claim 8 wherein the step of updating a floating point linear address register includes updating an event floating point linear address register if an event is being handled.

10. The method of claim 8 wherein the steps of generating a floating point save address microinstruction and generating a floating point save data microinstruction are performed by a fetch/decode unit.

11. The method of claim 8 wherein the step of updating the floating point linear address register is performed by a memory order buffer.

12. The method of claim 11 wherein the memory order buffer maintains the following information for each load and store operation:

an operation type field;

an address field; and a store identifier field.

13. The method of claim 8 wherein the floating point store data microinstruction triggers the update of the floating point linear address register by writing fault information.

14. A method comprising:

receiving an instruction stream including a floating point store data instruction;

generating a floating point store data microinstruction corresponding to the floating point store data instruction;

generating a floating point store address microinstruction, the floating point store data microinstruction and the floating point store address microinstruction including a sequence number; and in response to the execution of the floating point store data microinstruction, updating a floating point linear address using the sequence number corresponding to the floating point store address microinstruction.

15. The method of claim 14 wherein the steps of generating a floating point store data microinstruction and generating a floating point store address microinstruction are performed by a fetch/decode unit.

\* \* \* \* \*